(12) United States Patent
Lo et al.

(10) Patent No.: US 10,868,689 B2
(45) Date of Patent: Dec. 15, 2020

(54) MANAGEMENT DEVICE OF INTERNET-OF-THING DEVICES, COMMUNICATION SYSTEM AND COMMUNICATION METHOD

(71) Applicant: AmTRAN Technology Co., Ltd., New Taipei (TW)

(72) Inventors: Kuo-Chih Lo, New Taipei (TW); Tsung-Yi Lin, Tainan (TW); Chih-Chin Fan, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 14 days.

(21) Appl. No.: 16/264,687

(22) Filed: Feb. 1, 2019

(65) Prior Publication Data

US 2019/0245713 A1    Aug. 8, 2019

(30) Foreign Application Priority Data

Feb. 8, 2018    (TW) .............................. 107104555 A

(51) Int. Cl.
*H04L 12/28* (2006.01)
*H04W 12/00* (2009.01)
(Continued)

(52) U.S. Cl.
CPC ...... *H04L 12/2807* (2013.01); *G06K 7/10722* (2013.01); *G06K 7/1417* (2013.01);
(Continued)

(58) Field of Classification Search
CPC ............. H04L 12/2807; H04L 12/2834; H04L 63/0428; H04L 63/20; H04W 12/0017;
(Continued)

(56) References Cited

U.S. PATENT DOCUMENTS 9,485,231 B1    11/2016  Reese
9,667,635 B2     5/2017  Byers et al.
(Continued)

FOREIGN PATENT DOCUMENTS

CN    102263776 A    11/2011
CN    103517273 A     1/2014
(Continued)

*Primary Examiner* — Tauqir Hussain
(74) *Attorney, Agent, or Firm* — CKC & Partners Co., LLC

(57) ABSTRACT

A communication system includes a management device of Internet of Thing (IoT) devices and an agent communicatively coupled between the management device of IoT devices and plural cloud servers. The agent receives identification information corresponding to a first IoT device, and obtains a key hash corresponding to the first IoT device from one of the cloud servers that corresponds to the first IoT device according to the identification information, and transmits the key hash to the management device of IoT devices. The management device of IoT devices encrypts management information by utilizing the key hash and transmits the encrypted management information to the first IoT device. The management information includes a control hash. The first IoT device decrypts the management information to obtain the control hash, and encrypts a message by utilizing the control hash, and transmits the encrypted message to the management device of IoT devices.

10 Claims, 6 Drawing Sheets

(51) Int. Cl.

| | | |
|---|---|---|
| *G06K 7/10* | (2006.01) | |
| *G10L 15/22* | (2006.01) | |
| *H04L 9/08* | (2006.01) | |
| *H04L 29/06* | (2006.01) | |
| *G06K 7/14* | (2006.01) | |
| *H04W 12/04* | (2009.01) | |
| *H04L 12/24* | (2006.01) | |

(52) U.S. Cl.
CPC ............ *G10L 15/22* (2013.01); *H04L 9/0819* (2013.01); *H04L 12/2834* (2013.01); *H04L 41/28* (2013.01); *H04L 63/0428* (2013.01); *H04L 63/20* (2013.01); *H04W 12/0017* (2019.01); *H04W 12/04* (2013.01); *G10L 2015/223* (2013.01)

(58) Field of Classification Search
CPC .. H04W 12/04; G06K 7/10722; G06K 7/1417
USPC ........................................................ 709/223
See application file for complete search history.

(56) References Cited

U.S. PATENT DOCUMENTS

| | | | | |
|---|---|---|---|---|
| 9,762,556 | B2* | 9/2017 | James | H04L 63/0442 |
| 9,860,677 | B1* | 1/2018 | Agerstam | H04L 67/28 |
| 9,948,572 | B2* | 4/2018 | Sender | H04L 47/70 |
| 10,033,695 | B2* | 7/2018 | Furuichi | H04L 63/0245 |
| 10,230,710 | B2* | 3/2019 | Wang | H04L 61/6059 |
| 10,291,714 | B2* | 5/2019 | Mathews | H04L 67/125 |
| 10,334,439 | B2* | 6/2019 | Verma | H04W 12/08 |
| 10,382,307 | B1* | 8/2019 | Jindal | H04L 43/0876 |
| 10,389,753 | B2* | 8/2019 | Kawashima | H04L 9/3268 |
| 10,404,595 | B2* | 9/2019 | Ranjan | H04L 61/1547 |
| 10,425,242 | B2* | 9/2019 | Berdy | H04W 64/003 |
| 10,448,454 | B1* | 10/2019 | Tao | G06F 9/48 |
| 2015/0222621 | A1 | 8/2015 | Baum et al. | |
| 2016/0205106 | A1* | 7/2016 | Yacoub | H04W 12/04033 726/28 |
| 2016/0232782 | A1* | 8/2016 | Lee | H04W 52/028 |
| 2016/0262014 | A1* | 9/2016 | Zeng | H04W 4/80 |
| 2016/0309535 | A1* | 10/2016 | Myoung | H04W 72/0453 |
| 2017/0105171 | A1* | 4/2017 | Srivastava | H04W 4/70 |
| 2017/0265042 | A1* | 9/2017 | Choi | H04W 4/025 |
| 2017/0279671 | A1* | 9/2017 | Christopher | H04Q 9/00 |
| 2017/0280279 | A1* | 9/2017 | Ghosh | H04W 4/029 |
| 2018/0034914 | A1* | 2/2018 | Christopher | H04L 69/08 |
| 2018/0199386 | A1* | 7/2018 | Yuan | H04L 67/141 |
| 2018/0234496 | A1* | 8/2018 | Ratias | G06F 16/27 |
| 2018/0306891 | A1* | 10/2018 | Pon | H04W 4/02 |
| 2018/0358009 | A1* | 12/2018 | Daley | G06F 3/167 |

FOREIGN PATENT DOCUMENTS

| | | |
|---|---|---|
| CN | 105610786 A | 5/2016 |
| CN | 107147631 A | 9/2017 |
| TW | 201600992 A | 1/2016 |
| TW | 201628370 A | 8/2016 |

* cited by examiner

MANAGEMENT DEVICE OF INTERNET-OF-THING DEVICES, COMMUNICATION SYSTEM AND COMMUNICATION METHOD

RELATED APPLICATIONS

This application claims priority to Taiwan Application Serial Number 107104555, filed Feb. 8, 2018, which is herein incorporated by reference.

BACKGROUND

Field of Invention

The present disclosure relates to a communication system. More particularly, the present disclosure relates to a communication system including plural Internet of Thing (IoT) devices.

Description of Related Art

In current practice of registering an Internet of Things (IoT) device, a user needs to fill in personal information, an account and a password on a registration website so as to complete the registration process of the IoT device. Furthermore, there is no universal IoT device standard commonly adopted by the IoT device manufacturers. When the user wants to use a mobile phone to control plural IoT devices supplied by different manufacturers in a place, the user needs to download and install plural applications (APPs) corresponding to the different manufacturers into the mobile phone and to complete user registration processes on plural websites corresponding to different manufactures. Eventually, the user may use the APPs respectively to control the IoT devices supplied by different manufacturers.

Therefore, it is important to provide a simple and convenient method of registering the IoT devices supplied by different manufacturers and a universal management system for controlling the IoT devices.

SUMMARY

In order to solve the aforementioned problems, the present disclosure provides a communication system including a management device of IoT devices and an agent. The agent is communicatively coupled between the management device of IoT devices and plural cloud servers. The agent receives identification information corresponding to a first IoT device, and obtains a key hash corresponding to the first IoT device from one of the cloud servers that corresponds to the first IoT device according to the identification information, and transmits the key hash to the management device of IoT devices. The management device of IoT devices encrypts management information by utilizing the key hash and transmits the encrypted management information to the first IoT device. The management information includes a control hash. The first IoT device decrypts the management information so as to obtain the control hash, and encrypts a message by utilizing the control hash, and transmits the encrypted message to the management device of IoT devices.

Another embodiment of the present disclosure is related to a management device of IoT devices including a sound receiving unit, a control unit and a communication unit. The sound receiving unit is configured to receive a voice message. The control unit is coupled to the sound receiving unit, and the control unit is configured to generate identification information according to the voice message. The communication unit is coupled to the control unit. The communication unit is configured to transmit the identification information to an agent, and to receive a first message which includes a key and is from the agent. The communication unit receives a registration request message from an IoT device, and transmits the registration request message to the control unit. The communication unit receives management information from the control unit, and transmits the management information to the IoT device. The control unit generates the management information according to the key hash and the registration request message. The management information is encrypted by utilizing the key hash.

Another embodiment of the present disclosure is related to a communication method including: transmitting identification information corresponding to an IoT device to an agent through a management device of IoT devices; obtaining a key hash corresponding to the IoT device from one of a plurality of cloud servers that corresponds to the IoT device through the agent, and transmitting the key hash to the management device of IoT devices; updating a certification list of the management device of IoT devices; transmitting a registration request message to the management device of IoT devices through the IoT device; and transmitting management information to the IoT device when the management device of IoT devices approves the registration request message according to the certification list. The management information is encrypted by utilizing the key hash and includes a control hash. The IoT device decrypts the management information so as to obtain the control hash.

In summary, the present disclosure is configured to simplify the registration process by disposing a management device of IoT devices coupled to the agent. The management device of IoT devices may further uniformly manage all of the IoT devices in the space.

BRIEF DESCRIPTION OF THE DRAWINGS

In order to let above mention of the present disclosure and other objects, features, advantages, and embodiments of the present disclosure to be more easily understood, the description of the accompanying drawing as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Reference may be made to the accompanying drawings and various embodiments described below in order to make the disclosure more complete and detailed. On the other hand, known components and steps are not described in detail in the embodiments to avoid unnecessary limitation of the disclosure.

The term "couple" or "connect" used in the following various embodiments may mean two or more components physically contacted or electrically connected to the each other directly or indirectly, or it may also mean interactions of the two or more components.

In the description and the claims, unless articles are specially defined in the text, "a", "an", and "the" may generally refer to "one or more". It needs to be further understood that "include", "comprise", "have", and similar vocabularies used herein indicate recorded features, areas, integers, steps, operations, elements and/or components, but do not exclude the discussed or additional one or more other features, areas, integers, steps, operations, elements, components, and/or a group thereof.

Figure 1:
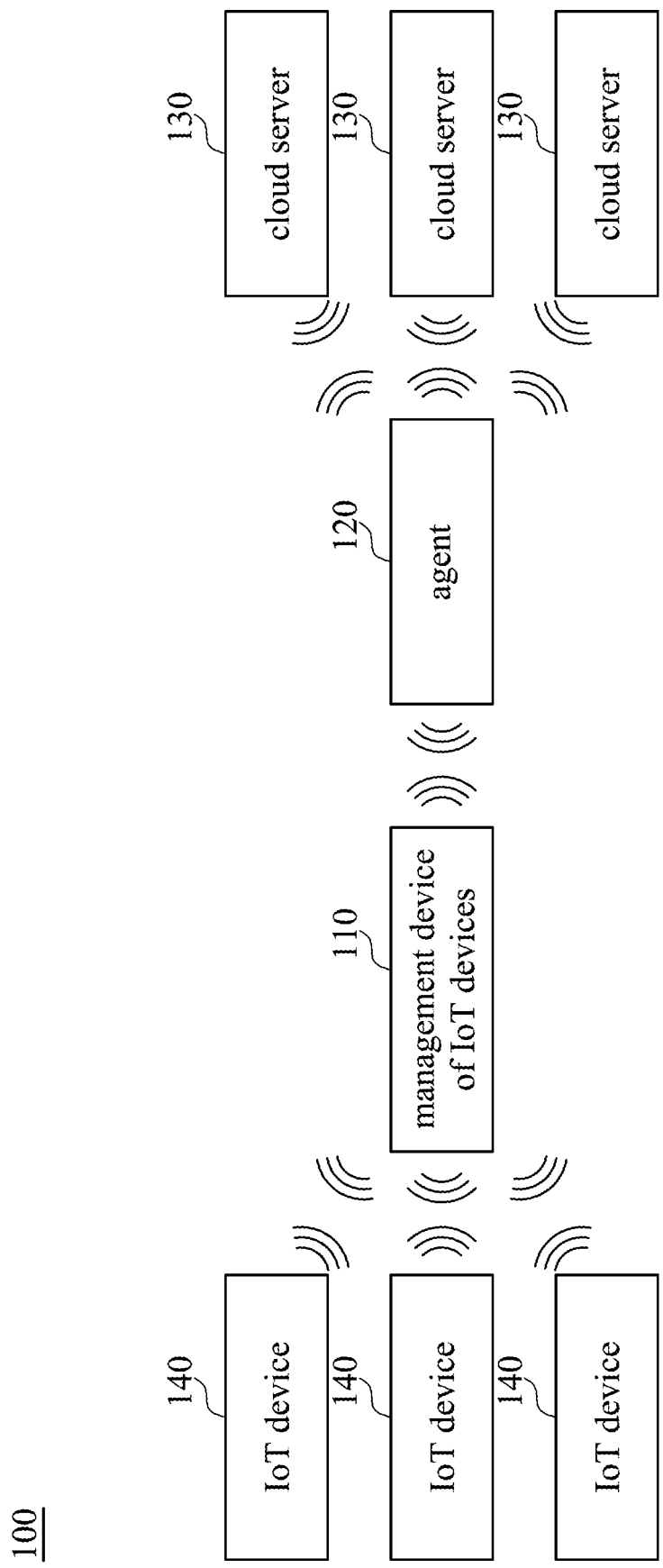
FIG. 1 illustrates a communication system according to some embodiments of the present disclosure.

FIG. 1 illustrates a communication system 100 according to some embodiments of the present disclosure. As shown in FIG. 1, in some embodiments of the present disclosure, the communication system 100 includes a management device of IoT devices 110, an agent 120, plural cloud servers 130, and plural IoT devices 140. The IoT devices 140 are communicatively coupled to the management device of IoT devices 110. The management device of IoT devices 110 is further communicatively coupled to the agent 120. The agent 120 is further communicatively coupled to the cloud servers 130. In some embodiments of the present disclosure, the management device of IoT devices 110 and the IoT devices 140 are devices located in the same place, such as a home management center and plural smart devices in a home.

In some embodiments of the present disclosure, the management device of IoT devices 110 is configured to manage the IoT devices 140 and to allow the IoT devices 140 to be communicated with the agent 120. In some embodiments of the present disclosure, the management device of IoT devices 110 is a Wi-Fi home unit located in the home which has software stack installed. However, the present disclosure is not limited to the exemplary embodiments and the management device of IoT devices 110 in the present disclosure can be any type of wireless communication devices which are capable of managing the IoT devices 140 and connecting to the network. In some embodiments of the present disclosure, the management device of IoT devices 110 connects to the network through a physical connection, such as a telephone or network cable, and has the functions of general wireless access point or router to provide wireless connectivity. That is, the management device of IoT devices 110 allows other network devices to be connected to the network wirelessly through the management device of IoT devices 110. The actual architecture and function of the management device of IoT devices 110 will be described in detail in FIG. 2.

In some embodiments of the present disclosure, the agent 120 is configured to be the interface between the management device of IoT devices 110 and the cloud servers 130, and to perform relatively complicated processing. In some embodiments of the present disclosure, the agent 120 is an agent of Artificial Intelligence (AI) platform. However, the present disclosure is not limited to the exemplary embodiments and the agent 120 can be other types of network platforms which are capable of processing data and communicating with the management device of IoT devices 110 and the cloud servers 130. For example, the agent 120 may be Google Cloud Platform or Amazon Alexa Platform. The architecture and function of the agent 120 will be described in detail in FIG. 3, and are not described here.

In some embodiments of the present disclosure, the cloud servers 130 are configured to provide the products of different manufacturers for sale online and register the sold products automatically. The key hash of each of the sold products is recorded by the cloud servers 130 as well. In some embodiments of the present disclosure, the cloud severs 130 may be implemented by utilizing third-party cloud service platforms. For example, the cloud severs 130 may be the servers corresponding to different manufacturers.

In some embodiments of the present disclosure, the IoT devices 140 are configured to generate plural operations corresponding to plural commands generated by the user transmitted through the network. In some embodiments of the present disclosure, each of the IoT devices 140 has software stack installed or embedded. The software stack of each of the IoT devices 140 has the same components as the components of the management device of IoT devices 110 where the functions of the components in the IoT devices 140 map to the components of the management device of IoT devices 110, or the software stack of each of the IoT devices 140 is compatible with the software stack of the management device of IoT devices 110. Therefore, the IoT devices 140 corresponding to different manufacturers are compatible with the management device of IoT devices 110. The software stacks provide the function for connecting to each other in order to transmit and receive messages and control other devices with compatible software stacks. The software stacks may further perform periodical self-detection procedures in the IoT devices 140 or the management device of IoT devices 110. In some embodiments of the present disclosure, the self-detection procedures of the IoT devices 140 or the management device of IoT devices 110 include steps of detecting whether the memory or the data is damaged; and if the memory or the data is damaged, determining whether it is necessary to re-acquire the data or to notify the user to repair the hardware. The self-detection procedures also include steps of detecting whether the operation functions of the IoT device itself are failed, the consumables in the device are insufficient, or the consumables in the device are damaged. For example, self-detection procedures detect whether the lighting function of a networked light bulb is normal, or detects whether the ink cartridge of the networked or IoT printer is low or empty. The self-detection procedures notify the user to repair the IoT devices 140 or to refill the consumables according to detection results. In some other embodiments of the present disclosure, the IoT devices 140 periodically generate and transmit the signal indicating the status of the IoT devices 140 via the management device of IoT devices 110 to the agent 120. If the agent 120 does not receive the periodical status signal of an IoT device 140, the agent 120 will determine that this specific IoT device 140 cannot operate normally.

In some embodiments of the present disclosure, the IoT devices 140 include network connected devices having different operation functions, such as web cameras, networked light bulbs, networked air conditioners, or networked dehumidifiers, which are not limited in the present disclosure. Any intelligent electronic device which can connect to the network falls within the scope of the present disclosure. The actual architecture and functions of the IoT devices 140 will be described in detail in FIG. 4, and are not described here.

In some embodiments of the present disclosure, the communication system 100 further includes a mobile device, which is not shown in the figures. The mobile device has applications (APPs) installed so as to control all of the IoT devices 140 in the user's home or other specific places. In some embodiments of the present disclosure, the aforementioned APP includes plural user interfaces corresponding to different IoT devices 140 respectively. The APP is capable of communicating with different IoT devices 140 and controlling the operation functions corresponding to the IoT devices 140 through the software stack. For example, the aforementioned user interfaces include plural user setting options corresponding to the networked light bulbs, the networked air conditioners, or a network refrigerator. After the user selects one of the user setting options that corresponds to one of the IoT devices 140, such as the networked light bulb, the operation function of the selected IoT device 140 can be adjusted through an adjustment user interface shown on the touch screen of the mobile device, such as a graphical knob shown in the graphical user interface on the touch screen of the mobile device and the user can turn or slide the graphical knob to adjust the brightness of a light bulb or bulbs in an area. From the application point of view, even if the user is not within the communication range of the management device of IoT devices 110, the APP loaded on the mobile device can still be utilized to control the IoT devices 140 within the home via the internet. For example, before the user returns home, the air conditioner and the water heater can be turned on remotely by the user using the APP. The user can also set the operating time and the fan speed of the air purifier or command the robotic vacuum cleaner to clean the floor remotely.

Figure 2:
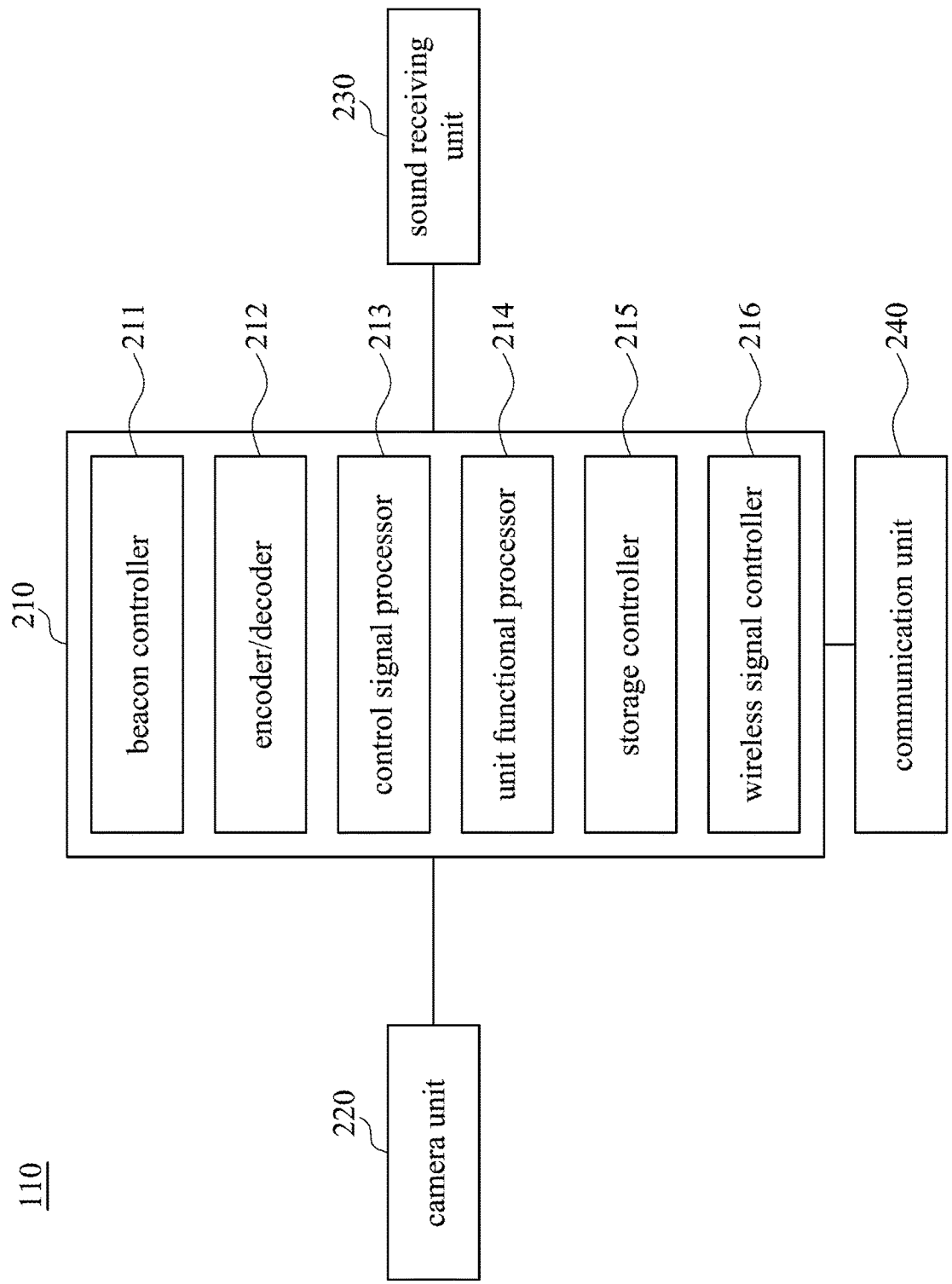
FIG. 2 illustrates a management device of IoT devices according to the embodiments of the present disclosure.

FIG. 2 illustrates the management device of IoT devices 110 according to the embodiments of the present disclosure. In some embodiments of the present disclosure, the management device of IoT devices 110, as shown in FIG. 2, includes a control unit 210, a camera unit 220, a sound receiving unit 230, and a communication unit 240. The control unit 210 is coupled between the camera unit 220, the sound receiving unit, and the communication unit 240.

In some embodiments of the present disclosure, the camera unit 220 is configured to capture image data of a two-dimensional code, for example, QR code, or a one-dimensional code, for example, barcode. The captured image data is transmitted to the control unit 210 for extracting or retrieving the information associated to the two-dimensional code or one-dimensional code. In some embodiments of the present disclosure, the camera unit 220 may be implemented by a digital or analog camera lens. In some embodiments of the present disclosure, the camera unit 220 may be used to capture images of the face, the motion, or the gesture of the user so as to perform identification, authentication, or generating and issuing the commands corresponding to the captured images.

In some embodiments of the present disclosure, the sound receiving unit 230 is configured to receive voice commands which are issued by the user and corresponding to the management device of IoT devices 110 and any of the IoT devices 140. For example, the sound receiving unit 230 is capable of receiving the voice command to the management device of IoT devices 110, such as "I want to purchase the model A of product B" or "Enter the search mode", spoke by the user. The sound receiving unit 230 is also capable of receiving the voice command to any of the IoT devices 140 from the user, such as "Turn on the light" or "Set the brightness of the light bulb to 70", spoke by the user. In some embodiments of the present disclosure, the management device of IoT devices 110 preliminarily processes the voice commands received by the sound receiving unit 230 and transmits the processed voice commands to the agent 120. After the agent 120 identifies the meaning of the processed voice commands, the agent 120 generates a feedback message in response to the processed voice commands and transmits the feedback message to the management device of IoT devices 110. The management device of IoT devices 110 provides information within the feedback message to the user. For example, the agent 120 searches information of the model A of product B according to the voice command from the user and then replies a searching result to the management device of IoT devices 110. The management device of IoT devices 110 provides the searching result to the user and requests the user's decision whether to purchase the model A of product B. In some embodiments of the present disclosure, the agent 120 generates a control command corresponding to specific IoT device 140 according to the voice message provided by the management device of IoT devices 110. For example, the voice message is identified as a control command for controlling or adjusting a light bulb. The agent 120 transmits content of the control command to the management device of IoT devices 110. The management device of IoT devices 110 generates a command for controlling the networked light bulb according to the control command.

In some embodiments of the present disclosure, the management device of IoT devices 110 can perform at least a part of voice identification. If the management device of IoT devices 110 can perform analysis on the user's voice message and identify the meaning of the voice message, the voice message will not need to be processed by the agent 120, and the management device of IoT devices 110 can performs different subsequent steps directly according to the identified meaning in the voice message. For example, after the management device of IoT devices 110 receives the voice message "I want to purchase the model A of product B" or "turn on the light" from the user, the meaning of the voice message is identified by the management device of IoT devices 110 and the management device of IoT devices then perform search or generate control command according to the identified meaning of the voice message. The information of the search result of, such as the model A of the product B, is provided to the user by the management device of IoT devices 110, or a control command corresponding to specific IoT device 140, such as the lights to be turned on, is generated and then issued by the management device of IoT devices 110. If the management device of IoT devices 110 cannot identify the meaning of the voice message generated by the user, or the management device of IoT devices 110 is not capable of processing the identified meaning of the voice message, the voice message is forwarded to the agent so as to perform identification and analysis.

In some embodiments of the present disclosure, the management device of IoT devices 110 communicates with the IoT devices 140 and the agent 120 directly or indirectly through the communication unit 240. In some embodiments of the present disclosure, the communication unit 240 is configured to provide wireless signal transmission to the IoT devices 140 and the agent device 120 according to a wireless communication protocol, such as Wi-Fi, Zigbee, or Bluetooth. The low-speed network communication protocols, such as Zigbee or Bluetooth, is configured to transmit signals for controlling devices, and the high-speed network communication protocol, such as Wi-Fi, is configured to transmit images or data of larger size.

In some embodiments of the present disclosure, the control unit 210 is configured to control the camera unit 220 to capture images, control the sound receiving unit 230 to receive audio signals, and control the communication unit 240 to transmit and receive signals. In some embodiments of the present disclosure, the control unit 210 is implemented by software stack. As shown in FIG. 2, the control unit 210 includes software stack, which comprises a beacon controller 211, an encoder/decoder 212, a control signal processor 213, a unit functional processor 214, a storage controller 215, and a wireless signal controller 216. In some embodiments of the present disclosure, the beacon controller 211 is configured to generate the messages including beacon setup signals, beacon control signals, and other beacon related signals. The encoder/decoder 212 is configured to encode the messages to be transmitted and to decode the received messages. The control signal processor 213 is configured to generate control signals to the IoT devices 140 corresponding to the received messages, such as controlling the networked light bulb to be turned on or turned off, controlling the networked air conditioner to be turned on or turned off, or other control commands to the IoT devices 140 connected to the management device of IoT devices 110. The unit functional processor 214 is configured to adjust the parameter settings of the corresponding IoT device 140, such as adjusting the brightness of the networked light bulb, adjusting the fan speed of the networked air conditioner, or other parameter settings to the IoT devices 140 connected to the management device of IoT devices 110. The storage controller 215 is configured to store the sensed data of the corresponding IoT devices 140, such as the duration of time in each day that the user turns on the networked light bulb or the temperature and the humidity insider the user's house measured by the networked air conditioner. The wireless signal controller 216 is configured to control receiving wireless signals and transmitting the wireless signals to the corresponding IoT device 140.

Figure 3:
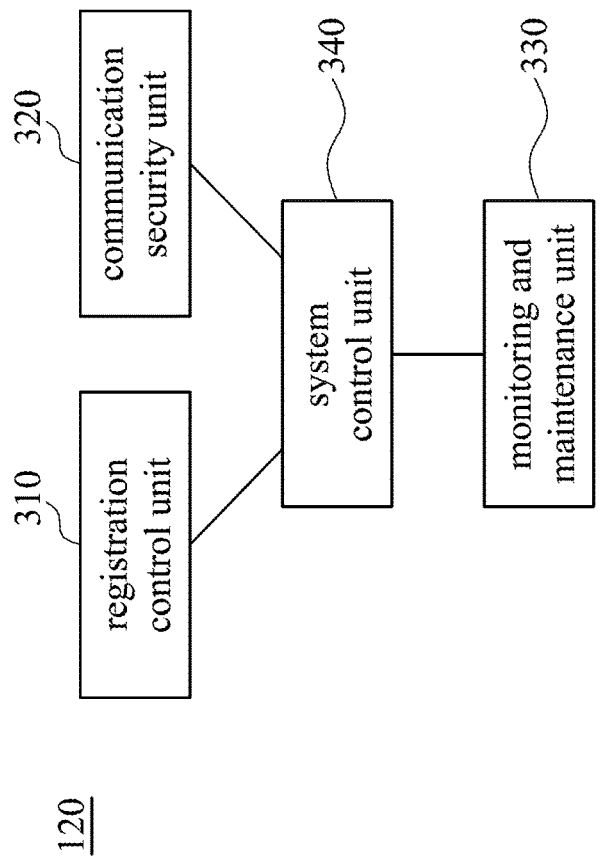
FIG. 3 illustrates an agent according to the embodiments of the present disclosure.

FIG. 3 illustrates the agent 120 according to the embodiments of the present disclosure. In some embodiments of the present disclosure, as shown in FIG. 3, the agent 120 includes a registration control unit 310, a communication security unit 320, a monitoring and maintenance unit 330, and a system control unit 340. The system control unit 340 is coupled between the registration control unit 310, the communication security unit 320, and the monitoring and maintenance unit 330. In some embodiments of the present disclosure, the registration control unit 310 is configured to control the registration process occurred between the management device of IoT devices 110 and the cloud servers 130. The communication security unit 320 is configured to protect the packets transmitted by the agents from being accessed by unauthorized others. The monitoring and maintenance unit 330 is configured to monitor and maintain the status of the IoT devices 140.

In some embodiments of the present disclosure, the monitoring and maintenance unit 330 will read the status data from each of the sensors in IoT devices 140 periodically, such as weekly, so as to determine whether the device or the environmental status of any IoT device 140 is abnormal. When the device or the environmental status of one of the IoT devices 140 is determined to be abnormal, a voice is outputted through the APP of the mobile device or through the management device of IoT devices 110 so as to notify the user that which IoT device 140 is abnormal and what kind of abnormal event occurs. For example, the monitoring and maintenance unit 330 is configured to periodically detect whether the temperature of the networked refrigerator is abnormal, and to periodically detect whether the food stored in the networked refrigerator is expired. In some embodiments of the present disclosure, the monitoring and maintenance unit 330 will perform different processes to monitor different IoT devices 140 or different status of an IoT device 140. For example, in order to prevent serious fire damages, the data of the environmental air and the environmental temperature sensed by a networked air conditioner is transmitted to the management device of IoT devices 110 or the mobile device of the user every few minutes or every few seconds. On the other hand, the complete self-testing procedure of the networked air conditioner is performed weekly or monthly and the result is transmitted accordingly. The status of the food stored in the networked refrigerator is monitored once a day, but the temperature inside the networked refrigerator is continuously monitored. When an abnormal event is found by the monitoring and maintenance unit 330, the management device of IoT devices 110 and the mobile device of the user are notified by the agent 120 immediately. The user may set the monitoring mode of IoT devices 110 by commanding the management device of IoT devices 110 directly or through the APP of the mobile device. The user can set the monitoring intervals of each IoT device 110, the message notifying time, the monitored events or signals, and other settings related to monitor the IoT devices 110, and the settings will be applied to different IoT devices 110 respectively. If the user does not change any settings, the IoT devices 140 will operate with the factory default settings.

Figure 4:
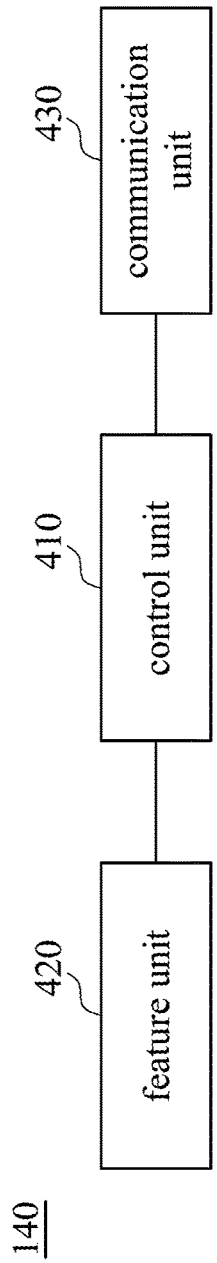
FIG. 4 illustrates an IoT device according to the embodiments of the present disclosure.

FIG. 4 illustrates the IoT device 140 according to the embodiments of the present disclosure. In some embodiments of the present disclosure, as shown in FIG. 4, the IoT device 140 includes a control unit 410, a feature unit 420, and a communication unit 430. The control unit 410 is coupled between the feature unit 420 and the communication unit 430. In some embodiments of the present disclosure, the software stack of the control unit 410 has the same components as the software stack of the control unit 210 of the management device of IoT devices 110 as shown in FIG. 2.

In some embodiments of the present disclosure, the feature unit 420 is configured to control the operation of the IoT devices 140. For example, the IoT device 140 may be a networked camera and the feature unit 420 within is configured to control the operations of photographing. The IoT device 140 may be a networked light bulb and the feature unit 420 within is configured to control the networked light bulb to be turned on/off or the brightness, color, or other lighting settings of the networked light bulb. The IoT device 140 may be a networked air conditioner, and the feature unit 420 within is configured to control the networked air conditioner to be turned on/off, the target temperature, the operation mode, and other operation settings of the networked air conditioner.

In some embodiments of the present disclosure, the IoT devices 140 wirelessly communicate with the mobile device of the user and the management device of IoT devices 110 through the communication unit 430.

Figure 5:
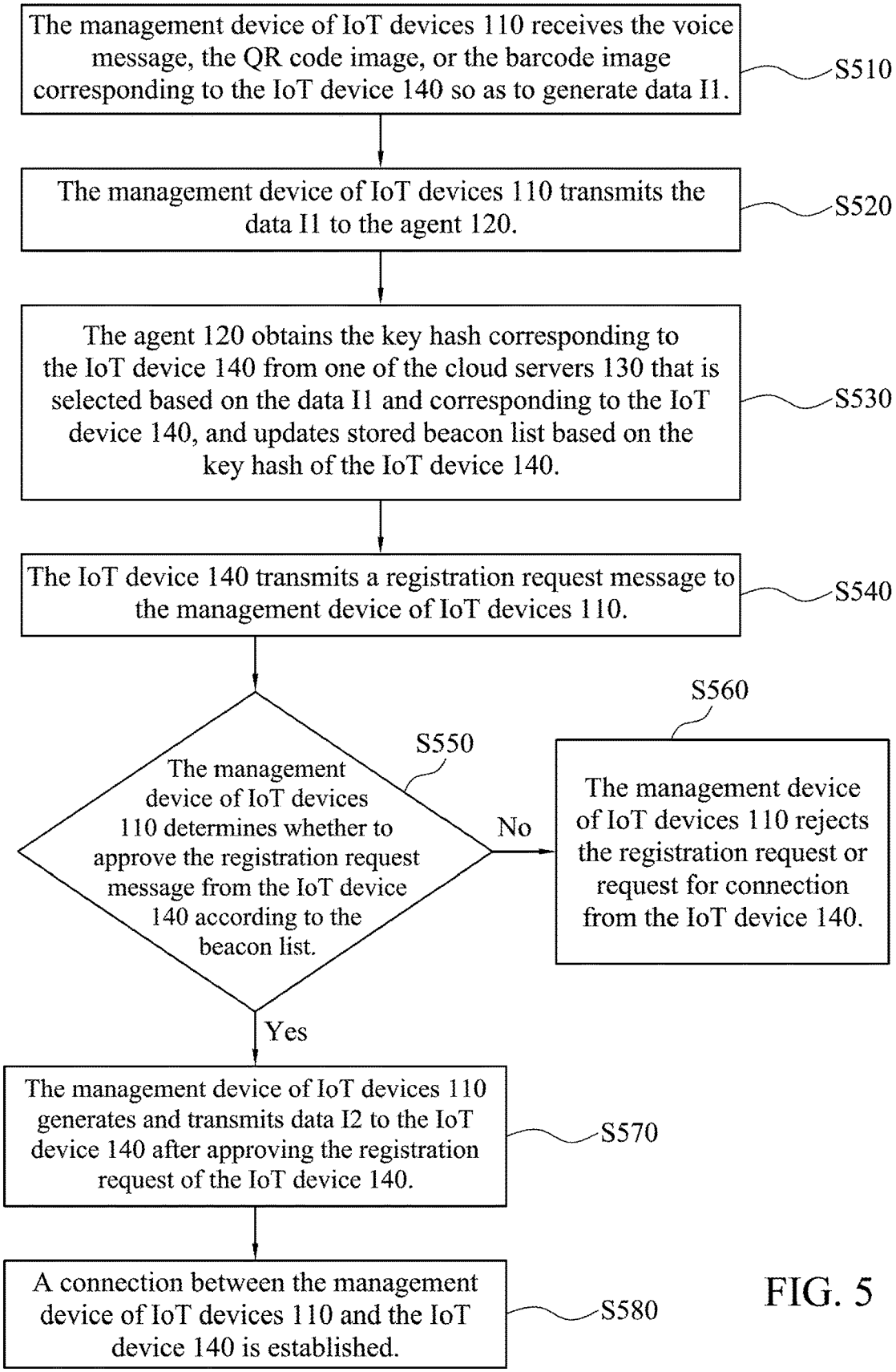
FIG. 5 illustrates a flowchart of a method for registering the communication system according to the embodiments of the present disclosure.

FIG. 5 illustrates a flowchart of a registration method 500 for a communication system of IoT devices according to the embodiments of the present disclosure. Referring to FIG. 1 and FIG. 5, the registration method 500 for the communication system 100 of the present embodiments basically comprises the steps illustrated in FIG. 5. It is noted that the method of the present embodiments described hereby does not exclude other accessory steps, such as power on step, detailed calculation processing steps accompanied with the described steps, or other steps related to the operation of the communication system 100.

As shown in FIG. 5, the step S510 is performed firstly that the management device of IoT devices 110 receives the voice message, the QR code image, or the barcode image, which is inputted by the user. The voice message, the QR code image, or the barcode image is corresponding to the IoT device 140 selected by the user, and the data I1 is generated by the management device of IoT devices 110 in response to the inputted voice message, the QR code image, or the barcode image. In some embodiments of the present disclosure, the data I1 is configured to identify the specific IoT device 140 selected by the user. In some embodiments of the present disclosure, at the step S510, the user is within a certain distance from the management device of IoT devices 110 and provides a voice message "I want to purchase a smart light bulb (or other IoT device)" to the management device of IoT devices 110. After the management device of IoT devices 110 receives this voice message, the management device of IoT devices 110 performs noise cancellation and signal enhancement on this voice message in order to enhance the vocal command within the voice message, and then the processed voice message is encapsulated as the data I1 and transmitted by the management device of IoT devices 110. In some embodiments of the present disclosure, the noise cancellation process includes steps of echo cancellation, background noise cancellation, and filtering out non-vocal frequency signals with a band pass filter. In some embodiments of the present disclosure, the user utilizes the APP on the mobile device to command the management device of IoT devices 110, the command generated by the APP is encapsulated as the data I1 by the management device of IoT devices 110. For example, the product model of the product to be purchased is transmitted through the APP of the mobile device to the management device of IoT devices 110, and then the message issued by the APP of the mobile device is directly encapsulated as the data I1.

In some other embodiments of the present disclosure, when the user has purchased one IoT device 140 and obtained the QR code or the barcode corresponding to the IoT device 140, the user further utilize the camera unit 220 on the management device of IoT devices 110 to capture the image of QR code or the barcode corresponding to the IoT device 140. The management device of IoT devices 110 converts the QR code image or the barcode image into the data I1 which identifies the IoT device 140.

Next, the step S520 is performed. The management device of IoT devices 110 transmits the data I1, which is corresponding to the IoT device 140, to the agent 120. In this step, the management device of IoT devices 110 transmits the processed voice message, the QR code image, or the barcode image corresponding to the IoT device 140 to the agent 120, wherein the product information of the IoT device 140 is retrieved from the processed voice message, the QR code image, or the barcode image. For example, the product type or product model of the IoT device 140 which the user intends to purchase is retrieved from the processed voice message, the QR code image, or the barcode image. In some embodiments of the present disclosure, the IoT device 140 is already delivered to the user and the voice message, the QR code image, or the barcode image inputted by the user include the International Mobile Equipment Identity (IMEI) code of the delivered IoT device 140, so the management device of IoT devices 110 retrieves the IMEI code of the delivered IoT device 140 from the processed voice message, the QR code image, or the barcode image and transmits the data I1 including the IMEI code of the delivered IoT device 140 to the agent 120.

Next, the step S530 is performed. The agent 120 obtains the key hash corresponding to this IoT device 140 from one of the cloud servers 130, wherein the one of the cloud servers 130 is selected based on the data I1 and corresponding to the IoT device 140. The management device of IoT devices 110 thus updates a stored beacon list based on the key hash of the IoT device 140. In some embodiments of the present disclosure, the agent 120 also analyzes the received and processed voice message in this step, such as "I want to purchase a smart bulb (or other IoT device)", and generates a request to purchase and registration one of the IoT device identified in the voice message and transmits the request to purchase and registration to one of the cloud servers 130 which is corresponding to the IoT device 140 identified in the voice message. For example, one of the cloud servers provided by the manufacturer or supplier of the IoT device 140, which the user wants to purchase, is selected as the target to receive the request to purchase and registration after the agent 120 analyzes the voice message. The cloud server then receives the request to purchase and registration and begins the purchase process in response to the request. After the purchase process is completed, the cloud server 130 which corresponds to the purchased IoT device 140 provides the key hash of the purchased IoT device 140 to the agent 120 as certification. At the same time, the cloud server 130 which corresponds to the purchased IoT device 140 provides address of the user to the manufacturer or supplier of the purchased IoT device 140, where the address of the user is provided by the user to the agent 120 or the cloud servers 130 beforehand, and requests the manufacturer or supplier of the purchased IoT device 140 to deliver the purchased IoT device 140 to the residence of the user. In some embodiments of the present disclosure, the cloud server 130 which corresponds to the purchased IoT device 140 anticipates the periods of time when the user is in the residence according to daily schedules or mode derived from the behavior records of the user, and requests to deliver the purchased IoT device 140 to the residence of the user at the anticipated periods of time. Next, the agent 120 transmits an identification code, for example, the IMEI code, and the key hash of the purchased IoT device 140 to the management device of IoT devices 110. The management device of IoT devices 110 stores characteristics corresponding to the purchased IoT device 140, according to the IMEI, the key hash, and other information from the agent 120, in the beacon list. Each IMEI code and key hash only correspond to a specific IoT device 140, and thus IMEI and the key hash can be utilized to identify or track the specific IoT device 140. In some embodiments of the present disclosure, the characteristics stored in the beacon list corresponding to the purchased IoT device 140 include device information, such as the product type of the IoT device, the model name of the IoT device, IMEI of the IoT device, the operation parameters of IoT device, and the key hash of the IoT device. The operation parameters include operation status, such as power on/off, and parameter settings, such as brightness and colors of a light bulb. The characteristics of different purchased IoT devices 140 may include different operation parameters based on the capabilities of the IoT devices 140. After the management device of IoT devices 110 registers all of the characteristics of the manageable IoT devices 140, the operation of the IoT devices 140 can be integrated and universally managed by the management device of IoT devices 110, so as to avoid the compatibility problems among different types of IoT devices or different manufacturers of IoT devices that require the non-compatible IoT devices to be separately controlled with different communication protocols or data formats.

In some embodiments of the present disclosure, the agent 120 analyzes the image of QR code or barcode received from the management device of IoT devices 110 and requests for registration of the IoT device 140 corresponding to the QR code or barcode by utilizing the website corresponding to the IoT device 140 in the step S530. The agent 120 then obtains the key hash corresponding to the IoT device 140 from one of the cloud servers which corresponds to the IoT device 140, for example, the server provided by the manufacturer or supplier of the purchased IoT device 140. Next, the agent 120 transmits IMEI and the key hash of the purchased IoT device 140 to the management device of IoT devices 110. The management device of IoT devices 110 stores the characteristics corresponding to the purchased IoT device 140 in the beacon list. In some embodiments of the present disclosure, the agent 120 retrieves the IMEI code of an IoT device 140 from the management device of IoT devices 110 and then obtains the key hash corresponding to the IoT device 140 from one of the cloud servers which corresponds to the IoT device 140. The key hash corresponding to the IMEI code of the purchased IoT device 140 is then transmitted to the management device of IoT devices 110 by the agent 120.

Next, the step S540 is performed. The IoT device 140 transmits a registration request message to the management device of IoT devices 110. In this step, the IoT device 140 is turned on and issues the registration request or request for connection message via broadcast. This registration request or request for connection message includes IMEI of this IoT device 140, the requested operation, such as registration or connection, and other characteristics of this IoT device 140.

Next, the step S550 is performed. The management device of IoT devices 110 determines whether to approve the registration request message from the IoT device 140 according to the beacon list. In this step, the management device of IoT devices 110 receives the registration request or request for connection message broadcasted by the IoT device 140 and determines whether the characteristics of the IoT device 140, at least including the IMEI code of the IoT device 140 in the registration request message, exists in the beacon list. If the characteristics of the IoT device 140 exist in the beacon list, the step S570 is continuously performed. If the characteristics of the IoT device 140 do not exist in the beacon list, the step S560 is performed.

In the step S560, the management device of IoT devices 110 rejects the registration request or request for connection from the IoT device 140. In the step S550, the management device of IoT devices 110 determines that this IoT device 140 is non-authorized or not purchased by the user based on the result that the characteristics of the IoT device 140 are not found in the beacon list. Thus, the management device of IoT devices 110 rejects the registration request or request for connection of the IoT device 140. In details, the management device of IoT devices 110 determines at least whether IMEI and the key hash of the IoT product exist in the beacon list, such as being stored in step S530, so the management device of IoT devices 110 is secure against connection from non-authorized IoT devices. If a neighboring IoT device 140 not owned by the user broadcasts a registration request message or a non-authorized IoT device 140 attempts to maliciously connect to the management device of IoT devices 110, the registration requests of these IoT devices must be rejected by the management device of IoT devices 110, otherwise the operation of the management device of IoT devices 110 will be impacted by the registered non-authorized IoT devices. Therefore, the purpose of the step S550 is to ensure the security of the communication transmission and the IoT system.

In the step S570, the management device of IoT devices 110 generates data I2 and transmits data I2 to the IoT device 140 after approving the registration request of the IoT device 140. In this step, the management device of IoT devices 110 encrypts a setting message by utilizing the key hash of the IoT device 140, and encapsulates the encrypted setting message as the data I2, which is then transmitted to the IoT device 140. In some embodiments of the present disclosure, the data I2 is configured to manage the IoT device 140 corresponding to the key hash received by the management device of IoT devices 110. In some embodiments of the present disclosure, the aforementioned setting message includes IMEI code of the IoT device 140, the operation setting or settings, a control hash, and the product model of the IoT device 140. The control hash is utilized to encrypt the subsequent communication transmission occurred between the management device of IoT devices 110 and the IoT device 140.

Next, the step S580 is performed. A connection between the management device of IoT devices 110 and the IoT device 140 is established. After the IoT device 140 receives the data I2, the data I2 is decrypted by utilizing a secret key stored by the IoT device 140, thereby the IoT device 140 obtains the setting message. The secret key is corresponding to the key hash and securely kept in the IoT device 140 when the IoT device 140 is out of the factory. The storage of the secret key is hardware-protected, and the secret key cannot be retrieved or cracked from the storage by external efforts. Therefore, the identity of the management device of IoT devices 110 is confirmed by the IoT device 140 when the IoT device 140 successfully decrypts and obtains the setting message with the secret key kept in the IoT device 140, which means that the secret key kept in the IoT device 140 matches the key hash stored in the management device of IoT devices 110. The management device of IoT devices 110 and the IoT device 140 then establish the connection according to content of the setting message, and the control hash included in the setting message is utilized to encrypt and decrypt the subsequent data packet transmissions. If the secret key of the IoT device 140 does not match the key hash of the management device of IoT devices 110, the IoT device 140 cannot obtain the content of the setting message. Thus, the IoT device 140 cannot obtain and utilize the control hash in the setting message for encrypting and decrypting the data transmission with the management device of IoT devices 110 and the connection between the management device of IoT devices 110 and the IoT device 140 cannot be established. In some embodiments of the present disclosure, this situation means that the IMEI code of the IoT device 110 is stored in the management device of IoT devices 110 but the IoT device 140 does not have the secret key corresponding to the key hash stored in the management device of IoT devices 110. The management device of IoT devices 110 will notify the user of the error with a broadcast sound message, an error notification displayed on the mobile device, or other types of notifications. The management device of IoT devices 110 may also notify the manufacturer or supplier corresponding to the IoT device 140 of the error status.

Figure 6:
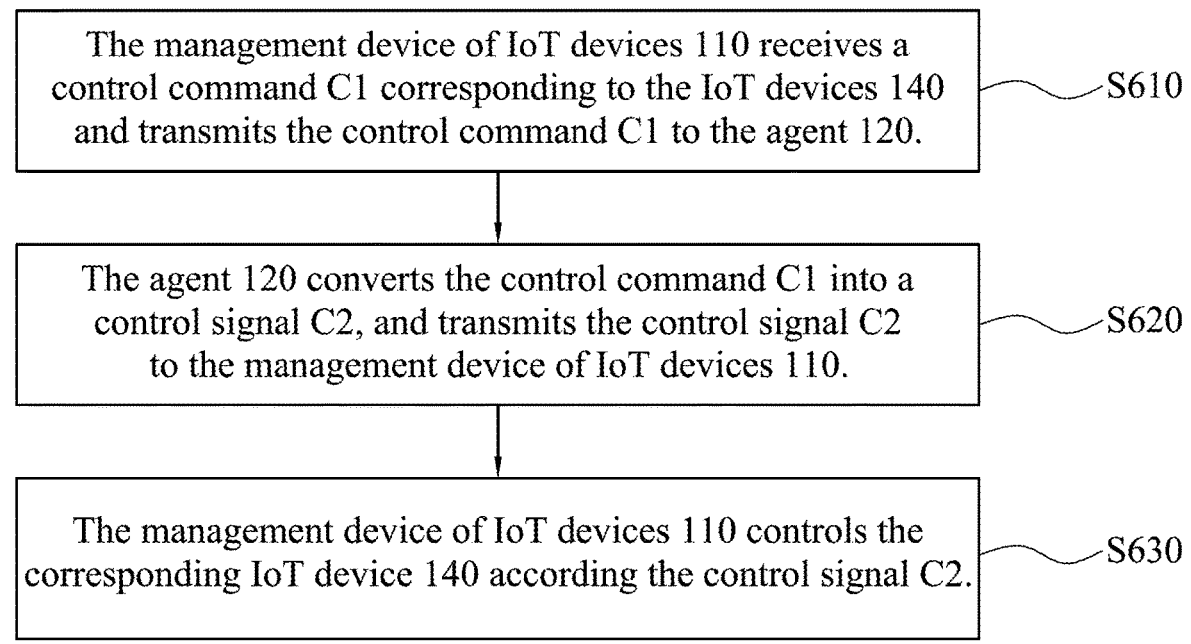
FIG. 6 illustrates a flowchart of a method for controlling the communication system according to the embodiments of the present disclosure.

FIG. 6 illustrates a flowchart of a method 600 for controlling the communication system 100 according to the embodiments of the present disclosure. The method 600 for controlling the communication system 100 of the present embodiments basically comprises the steps illustrated in FIG. 6. It is noted that the method of the present embodiments described hereby does not exclude other accessory steps, such as power on step, detailed calculation processing steps accompanied with the described steps, or other steps related to the operation of the communication system 100.

As shown in FIG. 6, the step S610 is performed firstly. In this step, the management device of IoT devices 110 receives the control command C1 corresponding to the IoT devices 140 and transmits the control command C1 to the agent 120. In details, a voice message including control command C1 for control an IoT device 140 or multiple IoT devices 140 is received by the management device of IoT devices 110 from the user. The management device of IoT devices 110 converts this voice command and obtains the control command C1 through processes including voice recognition, noise cancellation and signal enhancement, and then transmits this control command C1 to the agent 120.

Next, the step S620 is performed. The agent 120 converts the control command C1 into a control signal C2 and transmits the control signal C2 to the management device of IoT devices 110, wherein the agent 120 analyzes the meaning of the control command C1, identifies the IoT device or devices 140 to be controlled in the control command C1, and generates control signal C2 for the identified IoT device or devices 140 based on the meaning of the control command C1. In details, the agent 120 also encrypts the encapsulated control signal C2 with the control hash after the conversion of the control command C1. The encrypted control signal C2 is then transmitted back to the management device of IoT devices 110.

In some embodiments of the present disclosure, the agent 120 encrypts the control signal C2 in order to protect the IoT device or devices 140 corresponding to the control signal C2. If the agent 120 does not encrypt the control signal C2, a hacker may manipulate the IoT device or devices 140 in the home of the user by intercepting and modifying the control signal C2 through the network. For example, if the IoT device in control signal C2 is a networked camera, the hacker may modify the control signal to monitor the movements of the user in home through the network. If this IoT device 140 is a networked device which requires the user's account and password to log in, the hacker may access the account and the password inputted by the user. In some embodiments of the present disclosure, if the management device of IoT devices 110 has the capabilities for independently analyzing voice messages and converting the voice messages into control signals, the management device of IoT devices 110 analyzes the control command C1 and converts the control command C1 into the control signal C2 by itself, and thus the above processes are not needed to be performed by the agent 120 and the control command C1 is not transmitted to the remote agent 120.

Next, the step S630 is performed. The management device of IoT devices 110 controls the corresponding IoT device 140 according the control signal C2. In this step, the management device of IoT devices 110 controls the IoT device or devices 140 identified in control signal C2 that comply with the operation settings in the control signal C2 from the agent 120.

Figure 7:
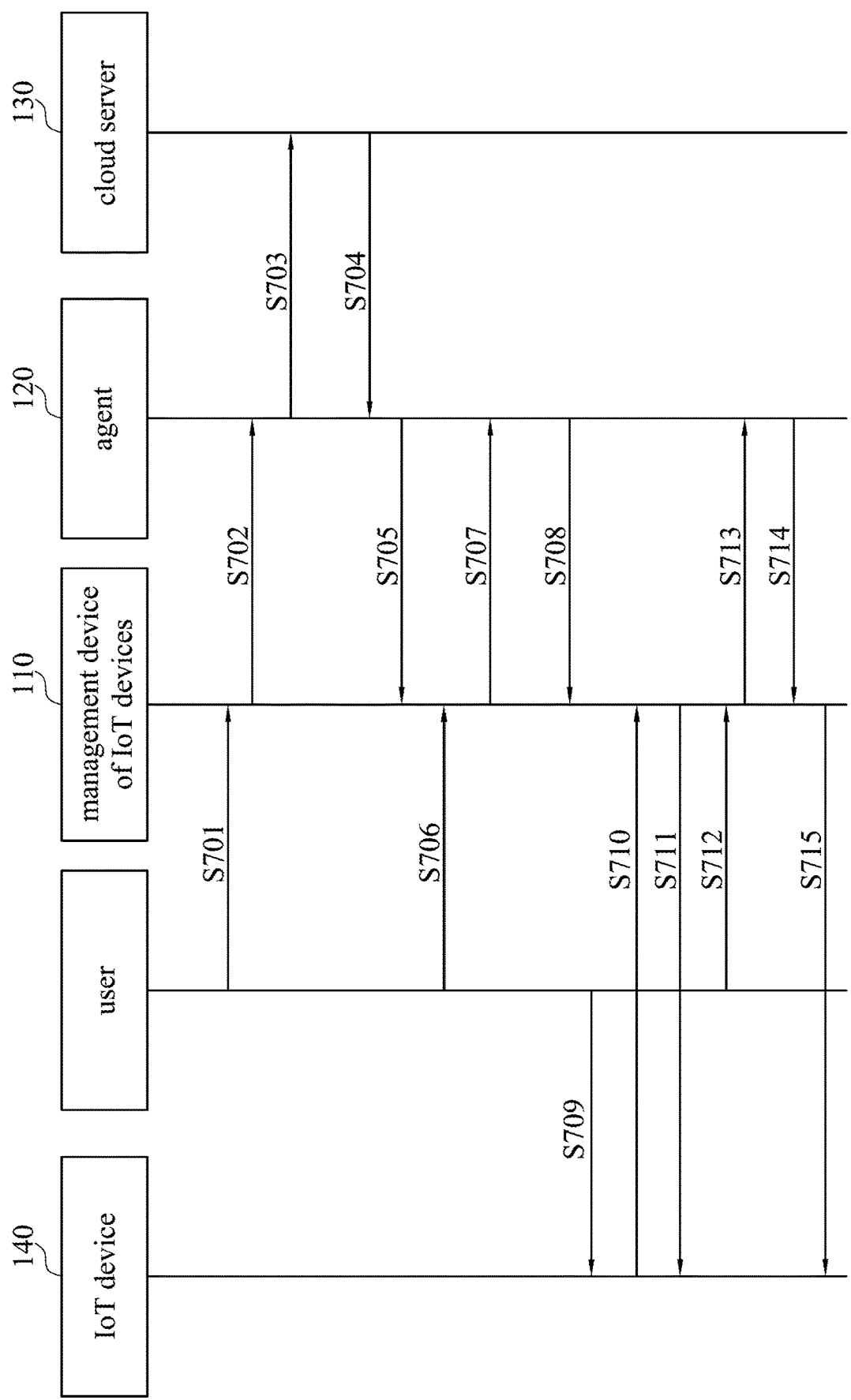
FIG. 7 illustrates a detailed flowchart of data transmission of the communication system according to the embodiments of the present disclosure.

Please refer to FIG. 1 and FIG. 7. FIG. 7 illustrates an exemplary time sequence of data transmissions in the communication system 100 for registering and controlling an IoT device 140 according to the embodiments of the present disclosure.

As shown in FIG. 7, firstly at the stage S701, the user provides the voice command, the QR code image, or the barcode image corresponding to the IoT device 140 to the management device of IoT devices 110. The detailed implementation of this stage is referred to the step S510 of FIG. 5.

Next, at the stage S702, the management device of IoT devices 110 transmits the data I1 to the agent 120. In some embodiments of the present disclosure, the data I1 includes IMEI corresponding to the IoT device 140 or other IoT product information included in the information received by the management device of IoT devices 110 at S701. The detailed implementation method of this stage is referred to the step S520 of FIG. 5.

Next, at the stage S703, the agent 120 requests one of the cloud servers 130 that corresponds to the IoT device 140 to register the IoT device 140 and provide the key hash of the IoT device 140. In some embodiments of the present disclosure, the agent 120 obtains IMEI corresponding to the IoT device 140 by reading the data I1, and requests the aforementioned cloud server 130 to register the IoT device 140 corresponding to the IMEI code.

Next, at the stage S704, the cloud sever 130 provides the key hash to the agent 120. In this stage, the cloud server 130 provides the key hash of the IoT device 140 corresponding to the received IMEI to the agent 120.

Next, at the stage S705, the beacon list of the management device of IoT devices 110 is updated with the key hash of the IoT device 140. In this stage, the agent 120 stores the received key hash and the received IMEI in the beacon list, and transmits the updated beacon list to the management device of IoT devices 110, or the agent 120 transmits the received key hash and the received IMEI to the management device of IoT devices 110, and the management device of IoT devices 110 updates the beacon list by itself and uploads the updated beacon list to the agent 120 for backup. In some embodiments of the present disclosure, the detailed implementation method of the stages S703-S705 is referred to the step S530 of FIG. 5.

Next, at the stage S706, the user sets the management device of IoT devices 110 to enter the search mode to search new IoT device 140 nearby. At this stage, the new IoT device 140 is unregistered in the management device of IoT devices 110 and the user provides voice message to request the management device of IoT devices 110 to enter the search mode at this stage in order to search and register the new IoT device 140. Therefore, when the IoT device 140 issues the registration request message, the management device of IoT devices 110, which is in search mode, will receive and recognize the registration request message issued by the IoT device 140.

Next, at the stage S707, the management device of IoT devices 110 transmits the voice message to request the management device of IoT devices 110 to enter the search mode to the agent 120. The management device of IoT devices 110 process the voice messages from the user with voice recognition, noise cancellation and signal enhancement and then transmits the above request to the agent 120.

Next, at the stage S708, the agent 120 requests the management device of IoT devices 110 to enter the search mode following the user's voice message. The agent 120 analyzes the voice message processed by the management device of IoT devices 110 and determines that the content of the voice message is commanding the management device of IoT devices 110 to enter the search mode or register a new IoT device. The agent 120 generates a request to enter the search mode in response to the analysis result of the content of the voice message. The request to enter the search mode is then transmitted to the management device of IoT devices 110, and the management device of IoT devices 110 enters the search mode after receiving the request from the agent 120. At the same time, the management device of IoT devices 110 automatically enters the Wi-Fi protected setup (WPS) mode or other protected connection mode.

Next, at the stage S709, the unregistered IoT device 140 issues the registration request message. The user may power on the unregistered IoT device 140 and sets the IoT device 140 to issue the registration request or request for connection message, or the IoT device 140 automatically broadcasting the registration request message or request for connection in accordance with the factory settings of the IoT device 140.

Next, at the stage S710, the IoT device 140 issues the registration request or request for connection message. In some embodiments of the present disclosure, the stages S706-S710 are the message transmissions in the step S540 of FIG. 5. At the same time, the IoT device 140 automatically enters the Wi-Fi protected setup (WPS) mode or other protected connection mode.

Next, at the stage S711, the management device of IoT devices 110 transmits the setting message to the IoT device 140. In some embodiments of the present disclosure, this setting message includes the control hash which allows the IoT device 140 to communicate with the management device of IoT devices 110. The detailed implementation method of this stage is referred to the step S570 of FIG. 5. In some embodiments of the present disclosure, at the same time, the management device of IoT devices 110 also transmits the control hash to the agent 120, so that the agent 120 can change or update the control hash for the management device of IoT devices 110. In detail, the agent 120 will change or update the control hash for ensuring network security after a threat on the network has been found or a defined period of time has passed, such as one month. In some embodiments of the present disclosure, if the IoT device 140 cannot successfully establish the connection with the management device of IoT devices 110 in a defined period of time, for example, two minutes, the IoT device 140 automatically exits the WPS mode in order to avoid possible brute-force attacks from the hackers, i.e., random ping messages are continuously generated and transmitted to the IoT device 140. If the IoT device 140 fails to establish connection, the user needs to cut off the power of the IoT device 140 and power on the IoT device 140 again to restart the request for registration process. Alternatively, the user may register the IoT device 140 with the cloud servers 130 in conventional manners.

After the IoT device 140 successfully decrypts the setting message from the management device of IoT devices 110 and obtaining the control hash, a confirmation message is generated by the IoT device 140 and transmitted to the management device of IoT devices 110. The management device of IoT devices 110 then generates and transmits a message for adding new IoT device to the mobile device of the user. The APP installed on the mobile device receives the message for adding new IoT device and modifies the control interface according to the message for adding new IoT device, so that the user may control the newly registered IoT device 140 through the App on the mobile device.

When the user wants to control the IoT device 140, at the stage S712, the user issues a voice command to the management device of IoT devices 110 or uses the APP on the mobile device to command the IoT device 140. For example, the voice command issued by the user may be "Turning on the light and setting the brightness to 70".

Next, at the stage S713, the management device of IoT devices 110 generates and issues the control command C1 based on the command received at S712 to the agent 120. In some embodiments of the present disclosure, the control command C1 is the content of the voice command from the user through voice processing performed by the management device of IoT devices 110. The detailed implementation method of the steps S712-S713 is referred to the step S610 of FIG. 6.

Next, at the stage S714, the agent 120 generates and transmits the control signal C2 to the management device of IoT devices 110. In some embodiments of the present disclosure, the control command C1 is converted so as to generate the control signal C2, and the control signal C2 is encrypted by utilizing the control hash. The detailed implementation method of this step is referred to the step S620 of FIG. 6.

Next, at the stage S715, the management device of IoT devices 110 transmits the control command to the corresponding IoT device 140. In some embodiments of the present disclosure, this control command is a beacon control signal generated according to the control signal C2. In some embodiments of the present disclosure, the contents of the aforementioned beacon control signal includes IMEI code of the corresponding IoT device 140, the operation settings, and the parameter settings of the IoT device 140 which are related to the user's voice command. The IoT device 140 receives the beacon control signal and decrypts the beacon control signal with the control hash. After the contents of the beacon control signal are obtained by the IoT device 140, the IoT device 140 modifies its operations according to the operation settings and parameter settings included in this beacon control signal. The detailed implementation method of this step is referred to the step S630 of FIG. 6.

In summary of the aforementioned descriptions, the flowcharts of the communication system 100 and the time sequence of data transmissions in the communication system 100 are provided. When the user wants to purchase and register one IoT device 140, the user only has to issue a voice command to the management device of IoT devices 110 and power on the purchased IoT device 140. The communication system 100 automatically certifies the IoT device 140 through the network and registers the IoT device 140 after the certification. Therefore, the present disclosure can greatly simplify the user's works for registering and controlling any of the IoT devices 140 in a place. The present disclosure may further enable the management device of IoT devices 110 to universally manage all of the IoT devices 140 nearby and maintain reliable security.

Although above DETAILED DESCRIPTION discloses the present disclosure. However, it is not used to limit the present disclosure. Those skilled in the art can make various changes and modifications without departing from the spirit and scope of the present disclosure. Therefore, the scope of the present disclosure should refer to the following claims.

What is claimed is:
1. A communication system, comprising:
a management device of Internet of Thing (IoT) devices; and an agent, communicatively coupled between the management device of IoT devices and a plurality of cloud servers;

wherein the agent receives identification information corresponding to a first IoT device, and obtains a key hash corresponding to the first IoT device from one of the cloud servers that corresponds to the first IoT device according to the identification information, and transmits the key hash to the management device of IoT devices;

wherein the agent updates a beacon list of the management device of IoT devices, the first IoT device transmits a registration request message to the management device of IoT devices;

wherein when the management device of IoT devices approves the registration request message by determining whether an International Mobile Equipment Identity (IMEI) code and the key hash corresponding to the first IoT device exist in the beacon list, the management device of IoT devices encrypts management information by utilizing the key hash and transmits the encrypted management information to the first IoT device, where the management information includes a control hash, wherein the first IoT device decrypts the management information to obtain the control hash, and encrypts a message by using the control hash, and transmits the encrypted message to the management device of IoT devices;

wherein the management device of IoT devices further receives a first control signal corresponding to the first IoT device and transmits the first control signal to the agent, wherein the agent converts the first control signal into a second control signal and transmits the second control signal to the management device of IoT devices, wherein the management device of IoT devices generates a command according to the second control signal and the control hash and transmits the command to the first IoT device so as to control the first IoT device.

2. The communication system of claim 1, wherein the management device of IoT devices has loaded a first software stack, and the first IoT device has loaded a second software stack compatible with the first software stack, so that the management device of IoT devices is communicatively coupled to the second software stack of the first IoT device through the first software stack of the management device of IoT devices.

3. The communication system of claim 1, wherein the management device of IoT devices further generates a first command according to a voice message corresponding to the first IoT device, so that the agent obtains the identification information corresponding to the first IoT device.

4. The communication system of claim 1, wherein the agent is configured to convert a voice command which is from the management device of IoT devices and corresponds to the first IoT device into an electrical signal, and to transmit the electrical signal to the management device of IoT devices, wherein the management device of IoT devices generates a control command according to the electrical signal, wherein the control command is encrypted by utilizing the control hash, wherein the management device of IoT devices transmits the encrypted control command to the first IoT device.

5. A management device of IoT devices, comprising:
a sound receiving unit, configured to receive a voice message;

a control unit, coupled to the sound receiving unit, wherein the control unit is configured to generate identification information according to the voice message; and a communication unit, coupled to the control unit, wherein the communication unit is configured to transmit the identification information to an agent, and to receive a first message which includes a key hash and is from the agent, wherein the agent updates a beacon list of the management device of IoT devices, wherein the communication unit receives a registration request message from an IoT device and transmits the registration request message to the control unit, wherein the communication unit receives management information from the control unit, wherein when the management device of IoT devices approves the registration request message by determining whether an IMEI code and the key hash corresponding to the first IoT device exist in the beacon list, the communication unit transmits the management information to the IoT device;

wherein the control unit generates the management information according to the key hash and the registration request message, wherein the management information is encrypted by utilizing the key hash;

wherein the management device of IoT devices further receives a first control signal corresponding to the IoT device and transmits the first control signal to the agent, wherein the agent converts the first control signal into a second control signal and transmits the second control signal to the management device of IoT devices, wherein the management device of IoT devices generates a command according to the second control signal and a control hash of the management information and transmits the command to the IoT device so as to control the IoT device.

6. The management device of IoT devices of claim 5, further comprising:
a camera unit, coupled to the control unit, wherein the camera unit is configured to capture a two-dimensional code image and to transmit the two-dimensional code image to the control unit,
wherein the control unit is configured to generate the identification information according to the two-dimensional code image or the voice message.

7. The management device of IoT devices of claim 5, wherein the sound receiving unit is further configured to receive a voice command, wherein the communication unit is further configured to transmit the voice command to the agent, and to receive an electrical signal which corresponds to the voice command and is from the agent, wherein the control unit further encrypts a control command in the electrical signal according to a control hash of the management information so as to generate a control signal, wherein the communication unit transmits the control signal to the IoT device.

8. A communication method, comprising:
transmitting identification information corresponding to an IoT device to an agent through a management device of IoT devices;

obtaining a key hash corresponding to the IoT device from one of a plurality of cloud servers that corresponds to the IoT device through the agent, and transmitting the key hash to the management device of IoT devices;

updating a beacon list of the management device of IoT devices;

transmitting a registration request message to the management device of IoT devices through the IoT device;

transmitting management information to the IoT device when the management device of IoT devices approves the registration request message by determining whether an IMEI code and the key hash corresponding to the first IoT device exist in the beacon list, wherein the management information is encrypted by utilizing the key hash and includes a control hash, wherein the IoT device decrypts the management information to obtain the control hash;

receiving a first control signal corresponding to the IoT device through the management device of IoT devices, and transmitting the first control signal to the agent;

converting the first control signal into a second control signal through the agent, and transmitting the second control signal to the management device of IoT devices; and generating a control command according to the second control signal and the control hash through the management device of IoT devices, and transmitting the control command to the IoT device so as to control the IoT device.

9. The communication method of claim 8, further comprising:

receiving a voice message corresponding to the IoT device through the management device of IoT devices, wherein the identification information transmitted from the management device of IoT devices to the agent includes the voice message; and obtaining an identification code corresponding to the IoT device from one of the cloud servers that corresponds to the IoT device according to the identification information through the agent.

10. The communication method of claim 8, wherein converting the first control signal into the second control signal through the agent comprising:

analyzing the first control signal through the agent, and obtaining a command content corresponding to the IoT device, and generating the second control signal including the command content.

* * * * *